United States Patent [19]

Kipp et al.

[11] 4,337,664

[45] Jul. 6, 1982

[54] PRESSURE GAUGE CONSTRUCTION

[75] Inventors: Frederick M. Kipp; Richard H. Wetterhorn, both of Fairfield, Conn.

[73] Assignee: Dresser Industries, Inc., Dallas, Tex.

[21] Appl. No.: 156,710

[22] Filed: Jun. 5, 1980

[51] Int. Cl.³ .............................................. G01L 7/04
[52] U.S. Cl. ........................................ 73/741; 29/418
[58] Field of Search .......... 73/741, 742, 743, 732–740, 73/431; 29/418

[56] References Cited

U.S. PATENT DOCUMENTS 3,937,088  2/1976  Stradella .............................. 73/741
4,161,888  7/1979  Bissell ................................. 73/741

Primary Examiner—Donald O. Woodiel
Attorney, Agent, or Firm—Daniel Rubin

[57] ABSTRACT

Method and apparatus for constructing a pressure gauge in which the socket and at least a portion of the movement for driving the pointer are initially formed integral of a molded polymeric plastic composition.

14 Claims, 17 Drawing Figures

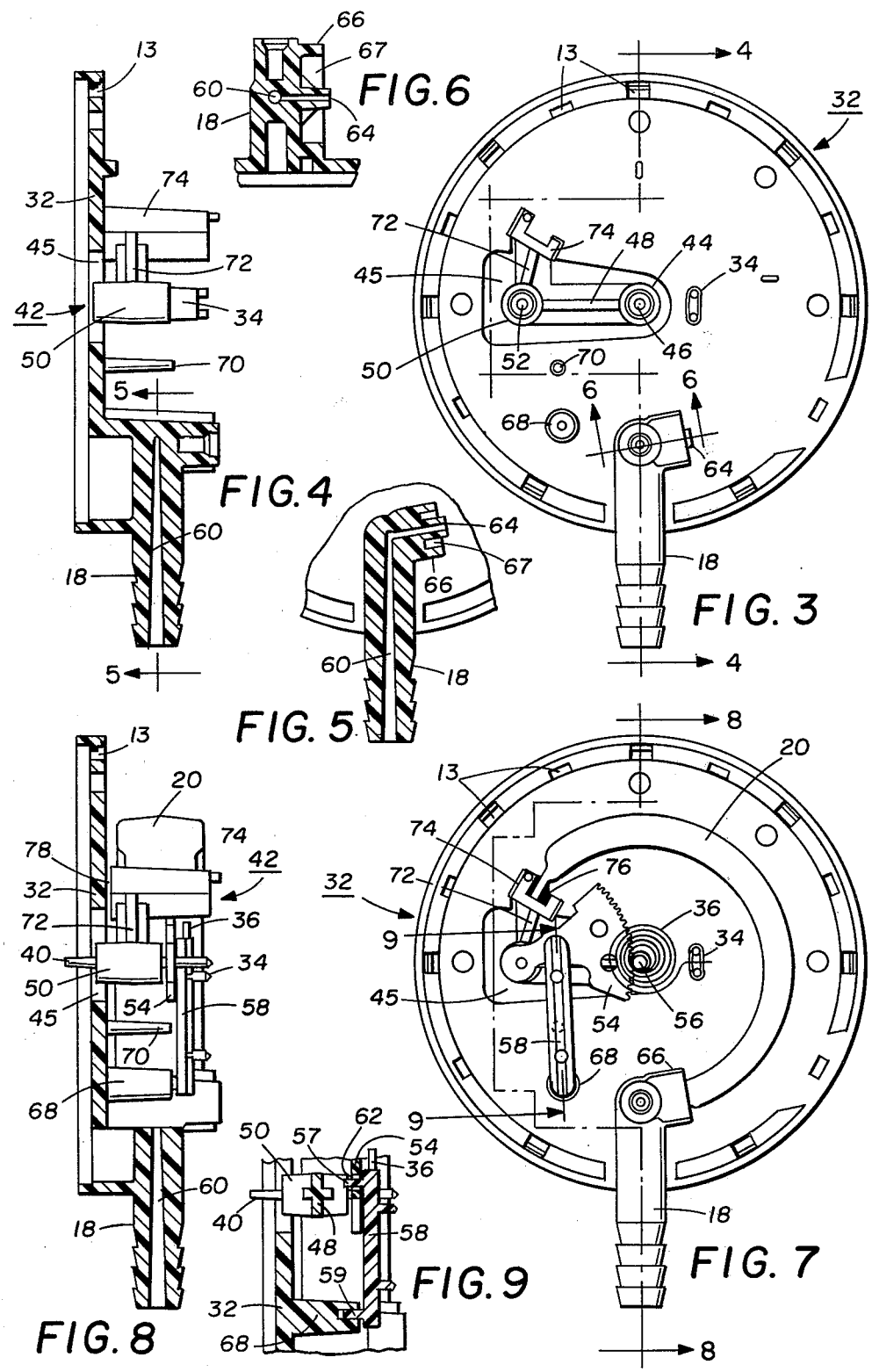

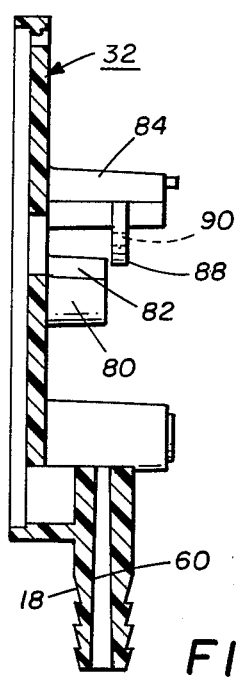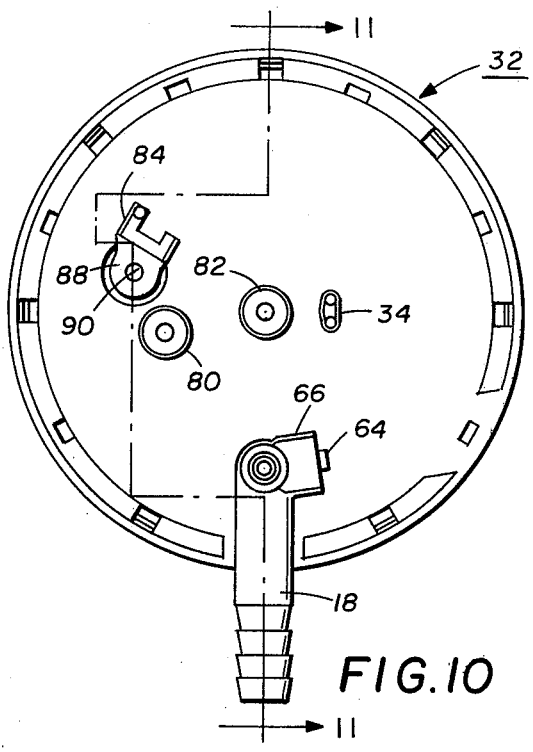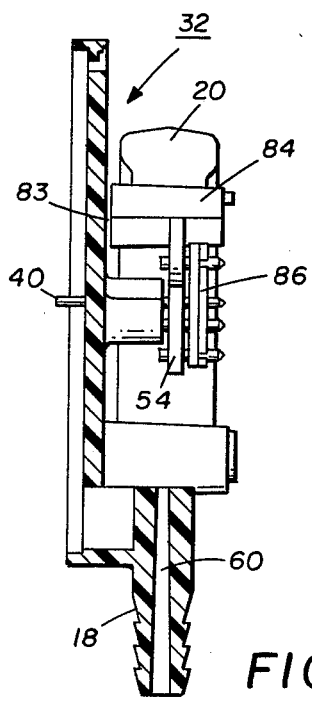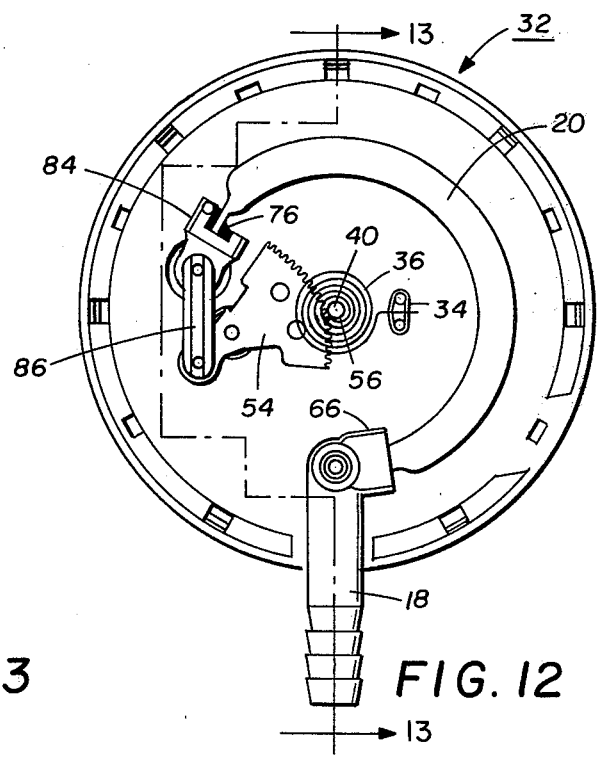

PRESSURE GAUGE CONSTRUCTION

TECHNICAL FIELD

The field of art to which the invention pertains comprises the art of measuring and testing as related to fluid pressure gauges.

BACKGROUND OF THE INVENTION

Pressure gauges enjoy very extensive commercial and industrial use and are consequently regarded as high production items. Because of such wide use, they are supplied by a plurality of manufacturers and sold in very price conscious competition. Each manufacturer instinctively strives to reduce product costs by improvements, however marginal, which reduce labor and/or materials that can contribute to cost savings in the end product.

In most conventional gauge constructions, each of the individual gauge components such as the socket, case, crystal, movement, Bourdon tube, etc. are separately manufactured and in turn require separate assembly to produce the finished gauge. While that approach to gauge manufacture has over the years been regarded as satisfactory, the production cost associated therewith, discounting inflation, has essentially leveled off. That is, while some cost reducing improvements have been generated for individual components as, for example, to the gauge movement as disclosed in U.S. Pat. No. 4,055,085 to R. H. Wetterhorn, the cost of components by and large and therefore final gauge cost have generally stagnated. Despite recognition of the problem, a ready solution has not heretofore been known.

SUMMARY OF THE INVENTION

The invention relates to pressure gauges and more specifically to method and apparatus for the construction of such gauges in order to realize significant reductions in manufacturing costs. This is achieved in accordance with the invention by integrally forming at least some individual components combined in an integral molded casting of polymeric plastic composition. By integrally forming, for example, the socket and at least portions of the movement of plastic composition, not only are these components formed per se in a less costly manner, but their combination lends to a more automated and therefore less costly assembly than has previously been possible.

It is therefore an object of the invention to provide novel method and apparatus for constructing a pressure gauge.

It is a further object of the invention to effect the foregoing object by molding at least portions of individual components as an integral assembly of plastic composition lending to more automated final assembly than has been possible in otherwise comparable constructions of the prior art.

It is a still further object of the invention to utilize the preceding object in realizing significant savings in the manufacturing costs of such gauges.

BRIEF DESCRIPTION OF THE DRAWINGS

FIG. 3 is a front elevation view of integrally molded components for the embodiment of FIG. 2;

FIG. 4 is a sectional view taken substantially along the lines 4—4 of FIG. 3;

FIG. 5 is a sectional view taken substantially along the lines 5—5 of FIG. 4;

FIG. 6 is a sectional view taken substantially along the lines 6—6 of FIG. 3;

FIG. 7 is an elevation view corresponding to FIG. 3 on which additional components have been assembled;

FIG. 8 is a sectional elevation taken substantially along the lines 8—8 of FIG. 7;

FIG. 9 is a sectional view taken substantially along the lines 9—9 of FIG. 7;

FIG. 10 is a front elevation view similar to FIG. 3 for a second embodiment hereof;

FIG. 11 is a sectional view taken substantially along the lines 11—11 of FIG. 10;

FIG. 12 is an elevation view corresponding to FIG. 10 on which additional components have been assmebled;

FIG. 13 is a sectional view taken substantially along the lines 13—13 of FIG. 12;

Referring now to FIGS. 1-9, the gauge construction in accordance herewith comprises a transparent plastic crystal 10 of clear polycarbonate and a molded plastic back unit 14, both of which attach via a plurality of circumferentially placed snap connections 12 to an intermediately located molded gauge frame 32 for forming a casing 16. An outwardly extending barbed or ribbed tubular stem 18 communicates inwardly of the casing with Bourdon tube 20 which in turn operates pointer 22 in a well known manner with respect to pressure indicia 24 imprinted on dial plate 26. Securing the dial plate in position are a pair of spaced fingers 28 laterally protruding from gauge frame 32 through an aperture 30 of the dial plate. Frame 32 also provides a plurality of circumferential apertures 13 for alternately receiving the snap-in tabs of crystal 10 and back unit 14 to effect connections 12.

Figure 1:
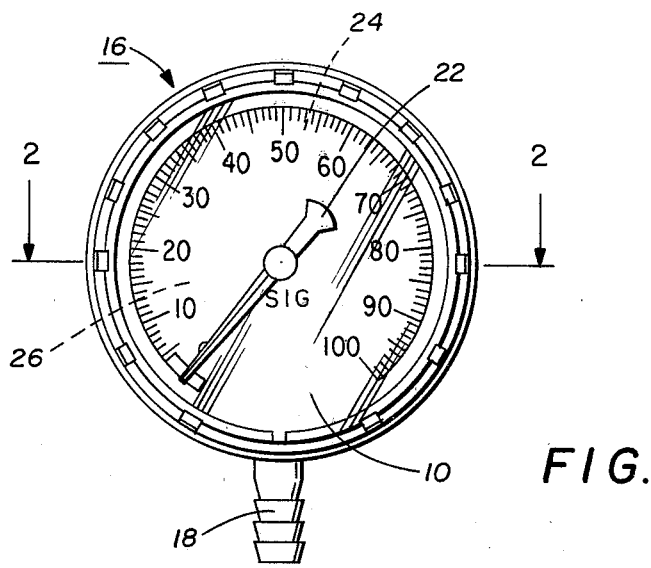
FIG. 1 is a front elevation of a bottom connected pressure gauge constructed in accordance herewith.
Figure 2:
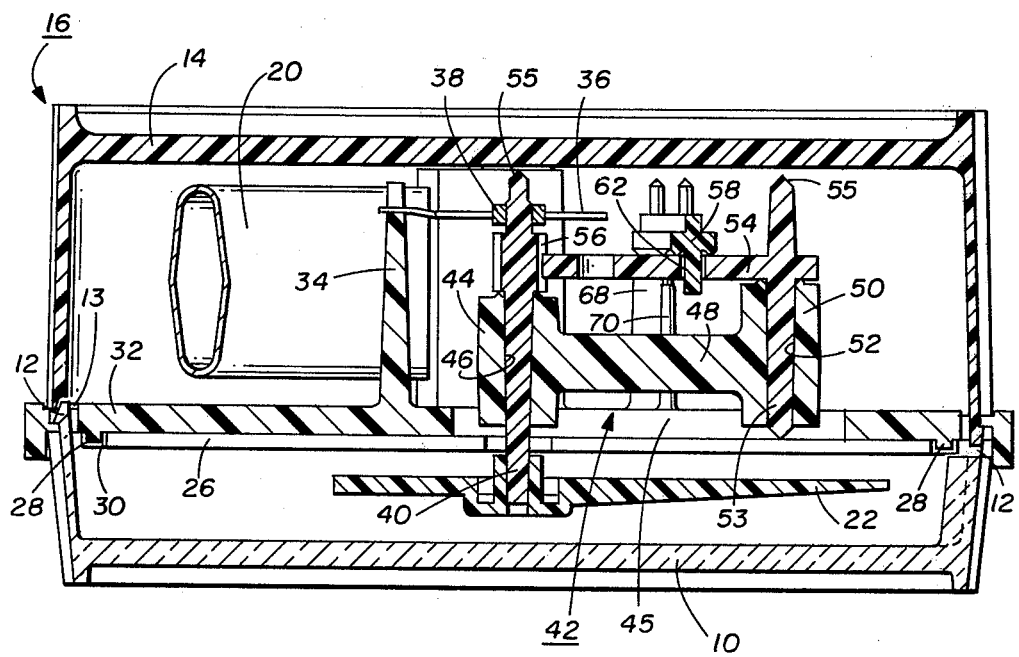
FIG. 2 is an enlarged sectional view taken substantially along the lines 2—2 of FIG. 1 for a first embodiment hereof.

Shown most clearly in FIGS. 2 and 3 are features, the functions of which will be understood and which include a tail boss 34 extending laterally integral from the rear face of gauge frame 32 for securing a wound hair spring 36. The spring in turn is connected to a collar 38 on shaft 40 integrally containing pinion 56 and supporting the pointer 22. Shaft 40 is journaled for rotation in a movement plate 42 that includes a boss 44 containing transverse journal bore 46 and suspended in frame aperture 45. Via intermediate web 48 boss 44 is joined with a boss 50 containing transverse journal bore 52. Journaled for rotation in bore 52 via its side shaft 53 is a segment gear 54 engaged in a gear driving relation with pinion 56. Formed on the inward ends of both shafts 40 and 53 is a pointed formation 55 terminating proximate the adjacent surface of cover 14 for limiting axial travel of the shafts.

Referring specifically to FIGS. 3-6, the integral construction in accordance herewith for achieving a floating movement embodiment as disclosed in U.S. Pat. No. 4,055,085 will now be described. Forming the base of this construction are the stem 18, gauge frame 32 and movement plate 42 all integrally cast as a unit by injection molding of a plastic composition such as polyester (PBT), nylon or polycarbonate, all suitably reinforced. Inlet pressure when supplied to the gauge is connected via suitable tubing (not shown) to stem 18 containing bore 60 communicating inward of the casing to a nib 64 for receiving the inlet connection of Bourdon tube 20. A flange 66 surrounds nib 64 to define a four sided pocket 67 therebetween constituting a recess for receiving and securing the Bourdon tube. Also cast integrally therewith is a journal boss 68 providing a journal for lower side pin 59 of link 58 (FIG. 9). A hair spring pre-wind boss 70 and hair spring tail boss 34 are similarly integral. A web 72 extending integral from boss 44 merges with a channel or cradle 74 for receiving the displacement end of Bourdon tube 20 as will be described.

For understanding assembly of the components just described into a completed gauge, reference is specifically made to FIGS. 7–9. Assembly is initiated by placing Bourdon tube 20 in position with its fixed end surrounding nib 64 and its displacement end in cradle 74. Both ends are then secured thereat by means of epoxy 76. After the epoxy has set, cradle 74 is cut from frame 32 as shown at clearance 78 (FIG. 8) so that the entire movement plate 42 is free to float with Bourdon tube 20 in the manner of U.S. Pat. No. 4,055,085. The pointer and pinion shaft 40 is then placed in journal bore 46 of boss 44 with pinion 56 positioned outward thereof. Following that placement segment 54 is similarly placed in journal bore 52 of boss 50 for meshing with pinion 56. With segment 54 appropriately positioned and held against pre-wind boss 70, the tail of hair spring 36 is placed between the spaced fingers of tail boss 34 while collar 38 is concomitantly pressed onto shaft 40. Releasing segment 54 enables operation thereof with a controlled prewound spring force being imposed. Link 58 can then be mounted via its lateral pins 57 and 59 to segment 54 and boss 68, respectively. At this point the unit thus far assembled can be completed by merely adding cover 14, dial 26 and pointer 22 before snapping crystal 10 into position. With the inside face of cover 14 being closely spaced to the ends of shafts 40 and 53, side thrust movement thereof is minimized.

Preferably, all components other than Bourdon tube 20, dial 26 and hair spring 36 are of a molded plastic composition, including apertures formed as-molded, thereby maintaining cost thereof to a minimum while eliminating typical manufacturing procedures involving conventional fasteners, machining, soldering, etc.

Referring now to FIGS. 10–13, there is illustrated a second embodiment for a stationary movement as disclosed, for example, in U.S. Pat. No. 4,109,537 rather than for the floating movement just described. Using the same reference numerals where applicable, frame 32 is again molded integral with socket tube 18 and tube cradle 84. After Bourdon tube 20 is secured at its ends by epoxy to pocket 64 and cradle 84, the cradle is severed from frame 32 at 83 as before. For this embodiment frame 32 additionally includes bearing bosses 80 and 82 for receipt of segment shafts 53 and pinion shaft 40, respectively. After link 86 is positioned connecting the tail end of segment 54 via aperture 90 in arm 88 to tube cradle 84, the gauge assembly is complete except for the pointer, dial, crystal and cover which are attached similarly as above.

Figure 15:
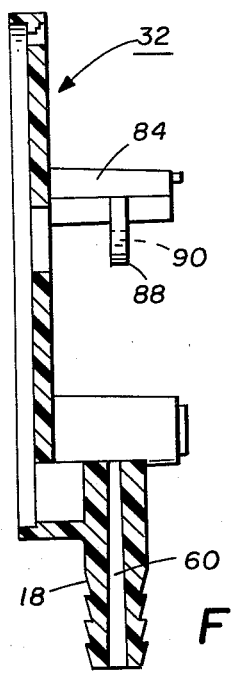
FIG. 15 is a sectional elevation taken substantially along the lines 15—15 of FIG. 14.
Figure 14:
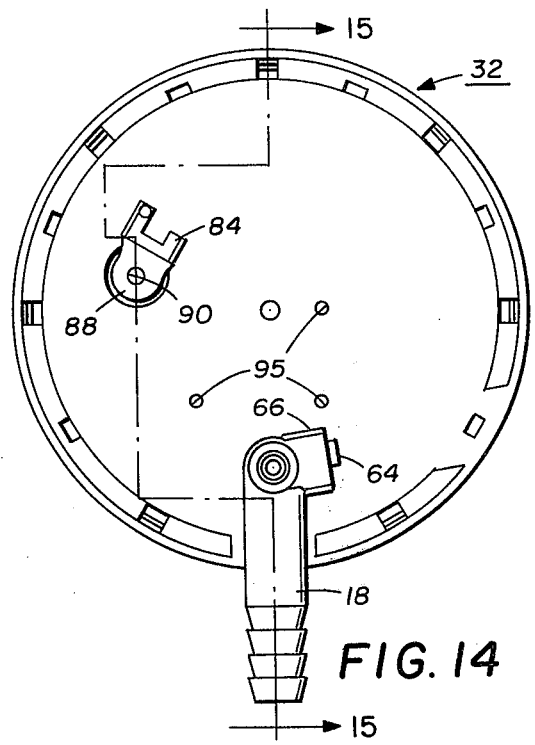
FIG. 14 is a front elevation view similar to FIG. 10 for illustrating an embodiment variation thereof.
Figure 17:
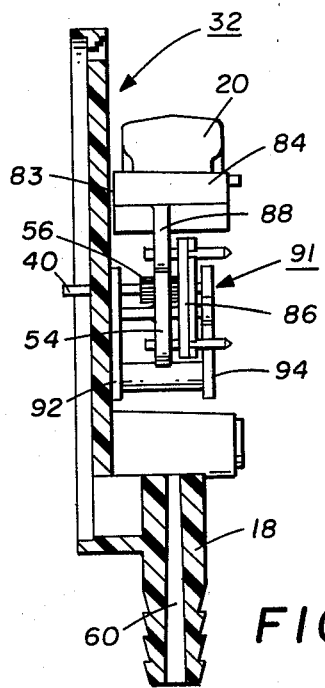
FIG. 17 is a sectional view taken substantially along the lines 17—17 of FIG. 16.
Figure 16:
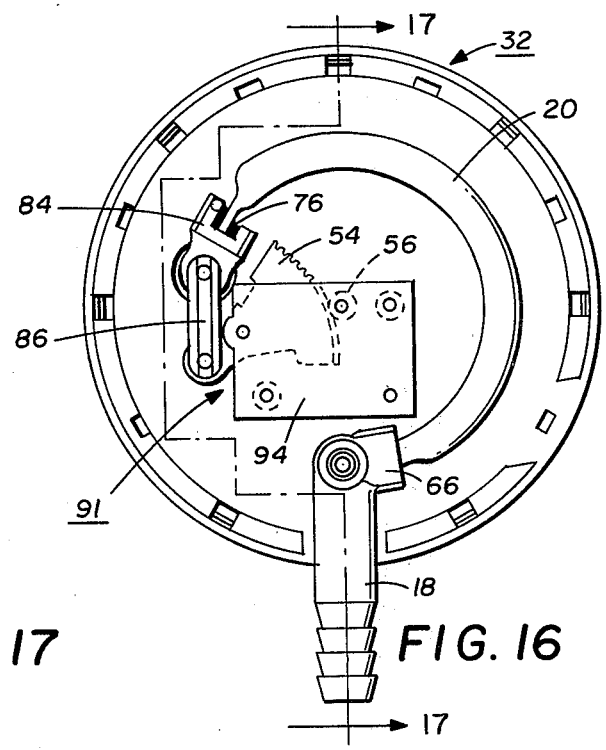
FIG. 16 is an elevation view corresponding to FIG. 14 on which additional components have been assembled.

FIGS. 14–17 represent a variation of the stationary construction of the immediately previous figures providing the option of supplying the gauge movement as a pre-completed sub-assembly. That is, it can be seen that FIGS. 14 and 15 are similar to FIGS. 10 and 11, respectively, less the bearing bosses 80, 82 and the hair spring tail boss 34. The movement, designated 91, being pre-assembled includes two parallel plates 92 and 94 between which both segment 54 and pinion 56 formed on shafts 40 and 52 are secured. Link 86 as above connects the segment gear 54 with the arm 88 of cradle 84 while apertures 95 in frame 32 receive protrusions (not shown) on plate 92 for mounting the movement.

By the above description there is disclosed a novel pressure gauge construction in which a plurality of components and component sections are combined in an integral molding of polymeric plastic. Not only therefore are those items per se manufactured in a less costly manner, but being combined with other components via the integral molding eliminates and/or minimizes the effort required for subsequent assembly thereof as compared to what has previously been required. Consequently, the foregoing construction lends itself to significant savings in both labor and material as compared to standard constructions previously utilized. Moreover, such constructions affords additional advantages such as incorporating blowout when required to accommodate relief of overpressure from within the casing. This can be readily achieved for example as by maintaining a relative weakness in the rear case as compared to that of the crystal either by weakened support for the former or by selecting the former to be of a lower strength plastic composition than the latter, i.e. for example using polypropylene for the former vs. polycarbonate for the latter.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a pressure gauge comprising a casing, a socket extending outward of said casing for connecting to a source of pressure to be gauged, a Bourdon tube extending from a fixed end in fluid communication with said socket to a free end displaceable in correlation to the values of pressure received at said socket and a movement operably transmitting pressurized displacement of said Bourdon tube to an output pointer shaft supported for rotation, the improvement comprising a formation of polymeric plastic composition molded with said socket and at least a displacement portion of said movement integrally joined therewith and from which said displacement portion has been severed.

2. In a pressure gauge according to claim 1 in which said improvement includes a support frame integrally joining said formation, said support frame being positioned in said casing at an intermediate location between the front and back thereof.

3. In a pressure gauge according to claim 2 in which the joined displacement portion of said movement comprised by said improvement is severed from said support frame after molding to receive the displaceable input from said Bourdon tube for operating a stationary movement mounted in said casing.

4. In a pressure gauge according to claim 2 in which the joined portion of said movement comprised by said improvement is severed from said support frame after molding for said entire movement to float conjointly with the displacement end of said Bourdon tube.

5. In a pressure gauge according to claim 4 in which said support frame includes a bored boss laterally extending integral therefrom at a predetermined location displaced from said movement and there is included an elongated link extending from said boss into a pivot defining relation with said movement.

6. In a pressure gauge according to claim 4 including a coiled spring applying a predetermined winding bias to said movement.

7. In a pressure gauge according to claims 1, 2, 3, 4, 5 or 6 in which the said displacement portion of said movement has a first integral formation to which the free end of the Bourdon tube is connected and said socket has a second integral formation to which the fixed end of the Bourdon tube is connected.

8. In a pressure gauge according to claim 7 in which each of said integral formations define a pocket-like area and said Bourdon tube is connected at said formations by a cement in said pocket-like area extending about the tube end thereat.

9. In a pressure gauge according to claim 8 in which the pocket-like area of said socket includes a protruding nib centrally located therein and extending inward of the Bourdon tube for communicating thereto values of fluid pressure received at said socket.

10. In the method of constructing a pressure gauge including a casing, a socket extending outward of said casing for connecting to a source of pressure to be gauged, a Bourdon tube extending from a fixed end in fluid communication with said socket to a free end displaceable in correlation to the values of pressure received at said socket and a movement operably connecting the free end of said Bourdon tube with an output pointer shaft supported for rotation, the improvement comprising the steps of molding said socket and at least a portion of said movement as a joined integral unit of molded polymeric plastic composition, connecting the fixed end of said Bourdon tube to said socket, connecting the free end of the Bourdon tube to said joined movement portion and severing said joined movement portion from said unit with which it was molded.

11. In the method of constructing a pressure gauge according to claim 10 in which said socket and the integral portion of said movement are joined by an integral support frame positioned in said casing at an intermediate location between the front and back thereof.

12. In the method of constructing a pressure gauge according to claim 11 including the step of connecting an elongated link from a location on said support frame into a pivot defining relation with said movement.

13. In the method of constructing a pressure gauge according to claims 10, 11 or 12 including the step of connecting a coil spring for applying a predetermined winding bias to said movement.

14. In the method of constructing a pressure gauge according to claim 13 in which the steps of connecting the ends of said Bourdon tube include the use of a cement for securing the connections thereat.

* * * * *